UNITED STATES PATENT OFFICE.

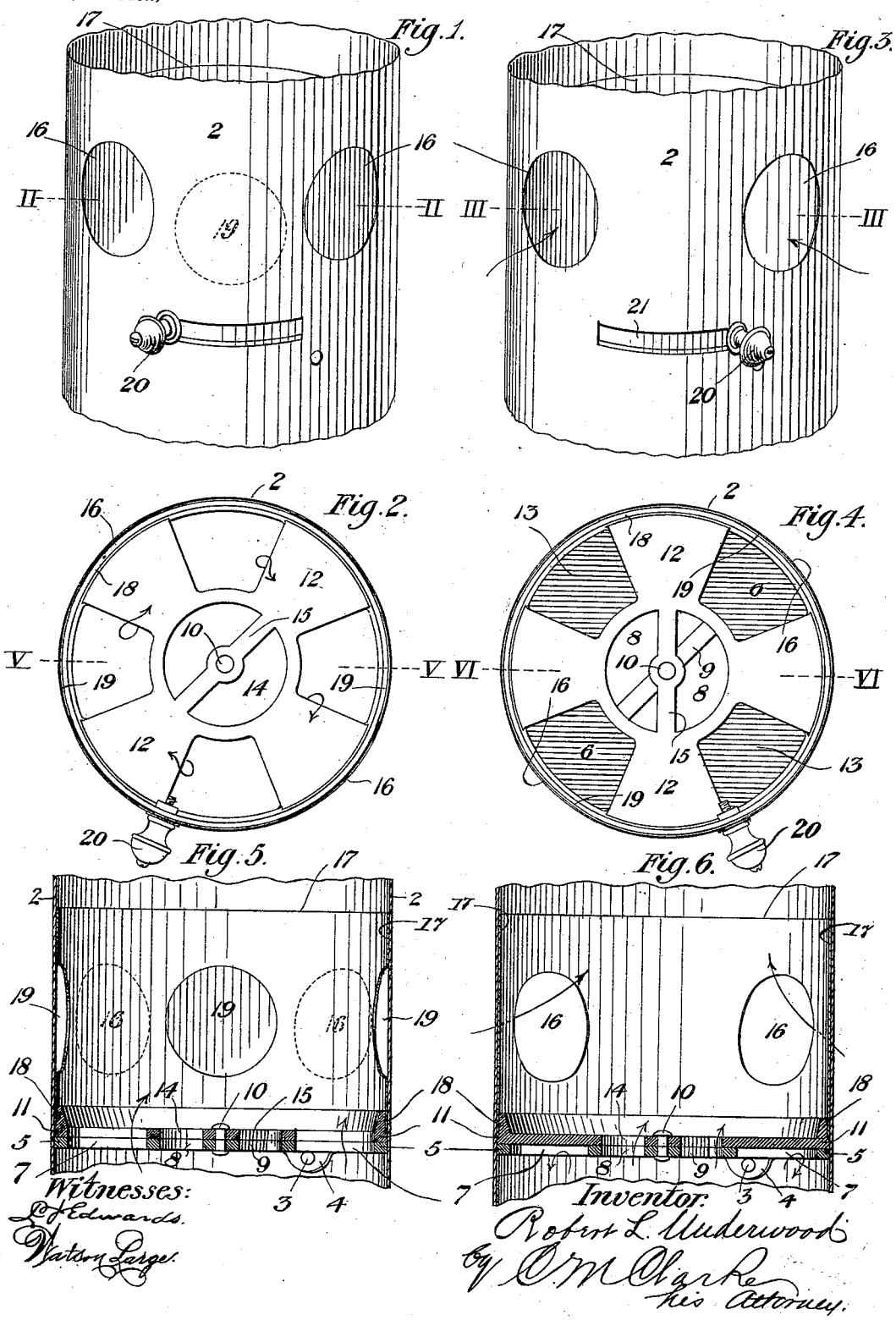

ROBERT L. UNDERWOOD, OF FOSTORIA, OHIO.

VENTILATING-DAMPER.

SPECIFICATION forming part of Letters Patent No. 607,669, dated July 19, 1898.

Application filed January 31, 1898. Serial No. 668,531. (No model.)

*To all whom it may concern:*

Be it known that I, ROBERT L. UNDERWOOD, a citizen of the United States, residing at Fostoria, in the county of Seneca and State of Ohio, have invented or discovered a new and useful Improvement in Ventilating-Dampers, of which the following is a full, clear, and exact description, reference being had to the accompanying drawings, in which—

Figure 1 is a perspective view of a section of stovepipe equipped with my improved device, showing the ventilating-openings closed. Fig. 2 is a cross-section through Fig. 1 on the line II II, showing the relative position of the damper, the same being open when the ventilating-openings are closed. Fig. 3 is a view similar to Fig. 1, but showing the ventilating-openings in register. Fig. 4 is a cross-section through Fig. 3 on the line III III, showing the damper closed when the ventilating-openings are in register. Figs. 5 and 6 are vertical longitudinal sections, indicated by the lines V V and VI VI of Figs. 2 and 4, respectively, further illustrating the different positions.

My invention relates to improvements in ventilating and controlling devices for outlet flues or pipes from furnaces, ranges, stoves, and the like, and has for its object the construction of a combination damper and ventilator designed to be inserted in the main pipe of the stove, &c., and by which the flow of the products of combustion may be regulated, thereby controlling the supply of air to the fire and consequently the intensity of combustion, while providing for the entrance to that part of the pipe above the damper of the surrounding atmosphere when the damper is closed and cutting off of such external ventilating-openings when the damper is opened. By admitting cold air in varying proportions above the damper, whereby it commingles with the products of combustion, the retarding action on the draft by operation of the damper is assisted and the proportions may be very accurately regulated. These results I accomplish by means of the construction and arrangement of parts shown in the drawings, which I shall now proceed to describe.

Referring thereto, 2 represents a section of the main pipe leading from any desired fuel-consumer to any point of exhaust—as, for instance, a flue. Arranged across the internal area of such pipe and secured thereto by rivets 3, passing through lugs 4, is a circular plate 5, having a series of segmental-shaped imperforate partitions 6 and similarly-shaped intervening alternate open spaces 7. At the center of the plate 5 is a circular opening 8 of reduced diameter, with a cross-rib 9, integral with the plate, dividing the opening 8 into equal halves and providing a central pivotal bearing for the rivet 10, by which the upper rotating damper-plate 11 is secured in position. This damper-plate corresponds in shape and proportions to the plate 5, having partitions 12 and open spaces 13, and when placed thereon is adapted to open or close the openings 7 in plate 5 by a partial rotation thereon in the well-known manner of dampers.

The damper-plate is made with a circular opening 14, coinciding with the opening 8, and also provided with a cross-rib 15, through the center of which also passes the pivotal rivet 10.

The ribs 9 and 15 are so located in the plates that in one position, as shown in Fig. 2, they will coincide, but when the upper plate 11 is shifted they will be somewhat transverse to each other, as shown in Fig. 4. It will be seen that in either position at all times an open passage will be maintained through the central openings 8 and 14, which is desirable for the purpose of maintaining a reduced draft when the damper is closed, whereby ventilation of the outside atmosphere is induced by suction through the openings in the shell of the pipe. These openings 16, preferably circular, are made through the body of the pipe-section immediately above the damper, and a short internal section of pipe 17 is riveted to an upwardly-extending flange 18 of the damper-plate 11 and so adapted to rotate therewith. By this arrangement the incoming cold air, through openings above the damper-openings, mingles with the products of combustion after they have passed through the damper and before the air has become warmed by coming into contact with heated surfaces.

Openings 19 of the same size and number as openings 16 are made in the pipe 17 and adapted to register therewith in one position when the damper is closed, as shown in Fig. 3, and to occupy a position midway, covering the opening by the intervening solid portion in the open position of the damper, as shown in Fig. 1.

The damper is rotated by means of a button 20, secured to the damper-plate 11 and projecting through a radial slot 21 in the body portion of the section, of a proper length to terminate the throw of the damper by reason of the stem of the button striking against either end of such slot in either position of the damper.

It will be seen that when the damper is opened and the ventilating-openings are closed the draft through the fire will be increased by air passing up therethrough and out through the pipe. When, however, the damper is closed, but a very limited draft will be maintained through the central openings, and ventilation of the surrounding atmosphere will be set up by reason of induced currents through the registering-openings 16 and 19 due to the passage of the products of combustion through the reduced central opening.

It will be seen that the section of pipe containing the damper and openings may be inserted in the main stovepipe at any position, and if it is desired to locate it near the ceiling for carrying off foul air the damper may be connected to operating-cords passing over grooved wheels at each side of the damper-stem or in any other convenient manner.

The advantages of my invention will be appreciated by those skilled in the art to which it refers, and while changes may be made in the design, arrangement, and proportions by the skilled mechanic I desire to include all such as within the scope of my present invention.

Having described my invention, what I claim is—

1. A ventilating-damper comprising a horizontal base adapted to be secured within a main conductor-pipe provided with a central opening and surrounding openings with intervening closed portions, a revoluble damper-plate thereon provided with corresponding openings and closed portions, and an upwardly-projecting pipe secured to the damper-plate having openings adapted to register with air-inlet openings in the surrounding conductor-pipe above the damper-openings, substantially as set forth.

2. A ventilating-damper comprising a horizontal base adapted to be secured within a main conductor-pipe provided with a central opening and surrounding openings with intervening closed portions, a revoluble damper-plate thereon provided with corresponding openings and closed portions, an upwardly-projecting pipe secured to the damper-plate having openings adapted to register with air-inlet openings in the surrounding conductor-pipe above the damper-openings, and an operating-stem secured to the damper-plate and projecting through a slot in the conductor-pipe, substantially as set forth.

3. In combination with a pipe provided with air-inlet openings, a horizontal damper-base secured within the pipe below such air-inlet openings, a revoluble damper-plate thereon adapted to open and close the main passage through the pipe, a common reduced central opening through the base and damper-plate, respectively, and an internal upwardly-projecting pipe secured to the damper having openings adapted to register with the air-inlet openings when the damper is closed and to close such passages when the damper is open, substantially as set forth.

In testimony whereof I have hereunto set my hand.

ROBERT L. UNDERWOOD.

Witnesses:
ALFRED MOORES,
L. E. SUGERMAN.